United States Patent
Guo et al.

(10) Patent No.: US 9,715,735 B2
(45) Date of Patent: Jul. 25, 2017

(54) IDENTIFYING REGIONS OF FREE SPACE WITHIN AN IMAGE

(71) Applicant: Flipboard, Inc., Palo Alto, CA (US)

(72) Inventors: Meng Guo, San Jose, CA (US); Filipe Fortes, Palo Alto, CA (US)

(73) Assignee: Flipboard, Inc., Palo Alto, CA (US)

( * ) Notice: Subject to any disclaimer, the term of this patent is extended or adjusted under 35 U.S.C. 154(b) by 0 days.

(21) Appl. No.: 14/604,663

(22) Filed: Jan. 23, 2015

(65) Prior Publication Data
US 2015/0213610 A1 Jul. 30, 2015

Related U.S. Application Data

(60) Provisional application No. 61/933,625, filed on Jan. 30, 2014.

(51) Int. Cl.
*G06T 7/11* (2017.01)
*G06T 7/12* (2017.01)
*G06T 7/00* (2017.01)
*G06K 9/00* (2006.01)

(52) U.S. Cl.
CPC ........ *G06T 7/0081* (2013.01); *G06K 9/00463* (2013.01); *G06T 7/11* (2017.01); *G06T 7/12* (2017.01); *G06T 2207/20021* (2013.01)

(58) Field of Classification Search
CPC ........ G06T 7/0081; G06T 2207/20021; G06T 7/11; G06T 7/12; H04L 67/10
USPC .................................................. 382/164, 173
See application file for complete search history.

(56) References Cited

U.S. PATENT DOCUMENTS

| | | | | |
|---|---|---|---|---|
| 6,272,251 | B1* | 8/2001 | de Queiroz | G06T 11/60 382/232 |
| 6,704,448 | B1* | 3/2004 | Hasegawa | G06K 9/00234 382/118 |
| 7,149,968 | B1* | 12/2006 | Ackerschewski | G06F 3/0481 715/255 |
| 2003/0174904 | A1* | 9/2003 | Yamaai | G06K 9/3283 382/292 |
| 2006/0083443 | A1* | 4/2006 | Tojo | G06K 9/4642 382/305 |

(Continued)

OTHER PUBLICATIONS

Yu et al. ("Combining Local and Global Features for Image Segmentation Using Interactive Classification and Region Growing," The 2nd Canadian Conference on Computer and Robot Vision, May 9-11, 2005).*

*Primary Examiner* — Yubin Hung
(74) *Attorney, Agent, or Firm* — Fenwick & West LLP

(57) ABSTRACT

A digital magazine server presents content, which may include images, retrieved from various sources to a user. To improve presentation of images while allowing modification of images, the digital magazine server identifies feature points in an image and identifies regions of the image including the feature points. Groups of regions are generated based at least on the number of feature points in each region and the location of each region. Based on information associated with the groups, such as the location of various groups and the aspect ratio of various groups, one or more groups are selected and associated with the image. The selected groups may identify regions of the image including an object or not including an object, providing information for modifying the image without obscuring objects in the image.

12 Claims, 8 Drawing Sheets

(56) References Cited

U.S. PATENT DOCUMENTS

| | | | |
|---|---|---|---|
| 2006/0126932 A1* | 6/2006 | Eschbach | G06K 9/00624 |
| | | | 382/173 |
| 2006/0165291 A1* | 7/2006 | Atsumi | H04N 1/3871 |
| | | | 382/190 |
| 2008/0279478 A1* | 11/2008 | Tsoupko-Sitnikov | H04N 19/54 |
| | | | 382/298 |
| 2010/0260417 A1* | 10/2010 | Dai | G06K 9/00456 |
| | | | 382/165 |
| 2012/0301015 A1* | 11/2012 | Tanase | G06F 17/3025 |
| | | | 382/159 |
| 2013/0024757 A1 | 1/2013 | Doll et al. | |
| 2013/0142405 A1* | 6/2013 | Nada | G06K 9/001 |
| | | | 382/124 |
| 2014/0074863 A1 | 3/2014 | Walkingshaw et al. | |
| 2014/0198127 A1 | 7/2014 | Ying | |
| 2015/0019957 A1 | 1/2015 | Ying et al. | |
| 2015/0019958 A1 | 1/2015 | Ying et al. | |
| 2015/0049902 A1* | 2/2015 | Moraleda | G06K 9/00624 |
| | | | 382/103 |

\* cited by examiner

IDENTIFYING REGIONS OF FREE SPACE WITHIN AN IMAGE

CROSS-REFERENCE TO RELATED APPLICATIONS

This application claims the benefit of U.S. Provisional Patent Application No. 61/933,625, filed on Jan. 30, 2014, which is incorporated by reference herein in its entirety.

BACKGROUND

This invention generally relates to analyzing images, and more specifically to identifying regions of an image free of objects prior to presentation to a user.

A digital magazine server provides digital content to its users as a digital magazine including various pages that each include content items arranged in positions relative to each other. Frequently, digital content provided to digital magazine server users includes images. To increase the number of content items presented in a page of the digital magazine, the digital magazine server often includes text providing additional information about an image in the image itself. However, conventional methods of including text in an image often result in the text being illegible or obscuring objects in the image likely to be of interest to a user.

Additionally, the digital magazine server may crop images to reduce the size of images presented to users by removing portions of the image. However, conventional methods of cropping images often crop objects in the image, reducing the information conveyed to a user by the image. For example conventional image cropping methods merely remove portions of an image based on image size, regardless of the content in different portions of the image.

SUMMARY

A digital magazine server retrieves content from one or more sources and generates a personalized, customizable digital magazine for a user based on the retrieved content. The digital magazine server organizes content items having at least one common characteristic into various sections based on page templates describing the relative positioning of content items to each other. Content items are presented to the user according to the sections.

The retrieved content items may be associated with images or include images, and the digital magazine server selects and/or modifies images for presentation to the user. For example, the digital magazine server identifies regions of an image including one or more objects. In one example, the digital magazine server identifies one or more feature points in an image. A feature point identifies a point of interest associated with an object in the image. For example, a feature point identifies a point in the image with at least a threshold change in color. The digital magazine server partitions the image into one or more regions and determines a number of feature points included in each region. Based at least in part on the number of feature points included in each region, the digital magazine server generates groups including one or more regions of the image.

One or more groups of regions are identified based at least in part on the number of feature points in each group. For example, groups including less than a threshold number of feature points are identified to indicate portions of the image in which text may be presented without obstructing objects in the image. As another example, groups including greater than a threshold number of feature points are identified to indicate portions of the image including content not to be cropped. In one embodiment, the groups are ranked based at least in part on the aspect ratio of the groups, the size of the groups, or another suitable characteristic of the groups, with groups identified based at least in part on the ranking. For example, groups with a higher position in the ranking are identified as portions of the image capable of including text or being cropped. Information describing the identified groups is stored in association with the image and may be communicated to a client device along with the image for modification of the image when it is presented.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
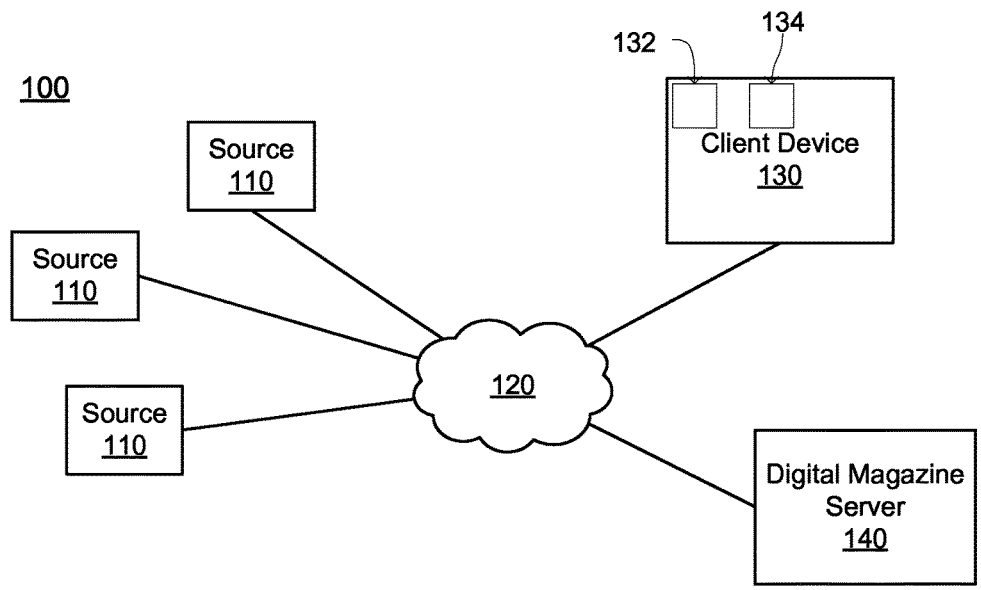
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," as a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device 130 may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
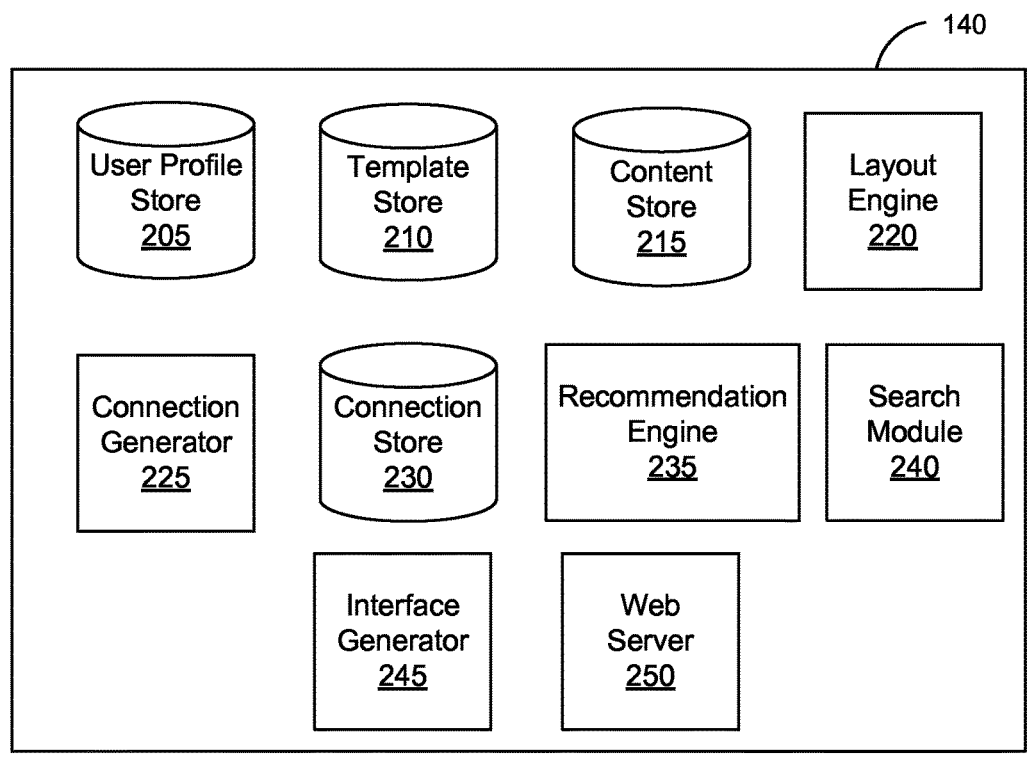
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, and in U.S. patent application Ser. No. 13/938,223, filed on Jul. 9, 2013, each of which is hereby incorporated by reference in its entirety.

The content store 215 stores objects that each represent various types of content. For example, the content store 215 stores content items received from one or more sources 115 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187,840, filed on Jul. 21, 2011, and in U.S. patent application Ser. No. 13/938,226, filed on Jul. 9, 2013, each of which is hereby incorporated by reference in its entirety.

In some embodiments, the layout engine 220 identifies regions of an image retrieved from the content store 215 or from one or more sources 110, that do not include an object. Alternatively, the layout engine 220 may identify regions of a retrieved image that include an object. As further described below in conjunction with FIG. 4, the layout engine 220 identifies feature points in the image and identifies groups of regions of the image based on the number of feature points in various regions. The feature points in an image are associated with one or more points of interest associated with an object. One or more groups are selected based on a number of feature points included in various groups. For example, the groups of regions are ranked based at least in part on the number of feature points in each group, and one or more groups are selected based on the ranking. Information identifying positions of the selected groups within the image is associated with the image. The image may then be modified based on the selected groups. For example, text is included in the image in positions of the image associated with one or more selected groups of regions if the groups are selected based on having less than a threshold number of feature points. This allows the image to be modified to include text in one or more of the groups of regions, and the modified image is presented to a user of the digital magazine server 140, allowing additional information to be presented along with the image while increasing the amount of display area available to display additional content items. Alternatively, the image may be modified by cropping portions of the image associated with selected groups if the groups are selected based on including at least a threshold number of feature points. This allows the image size to be reduced without removing certain objects of the image.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, a the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 110 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, an image may be modified based on identified regions of the image including objects or not including objects and the modified image presented by a digital magazine application executing on the client device 130. Alternatively, information identifying slots of a page template used to generate a page of a digital magazine are communicated from a client device 130 to the digital magazine server 140, which identifies one or more images for presentation in content regions of a page; the modified images are communicated from the digital magazine server 140 to the client device 130 for presentation.

Page Templates

Figure 3:
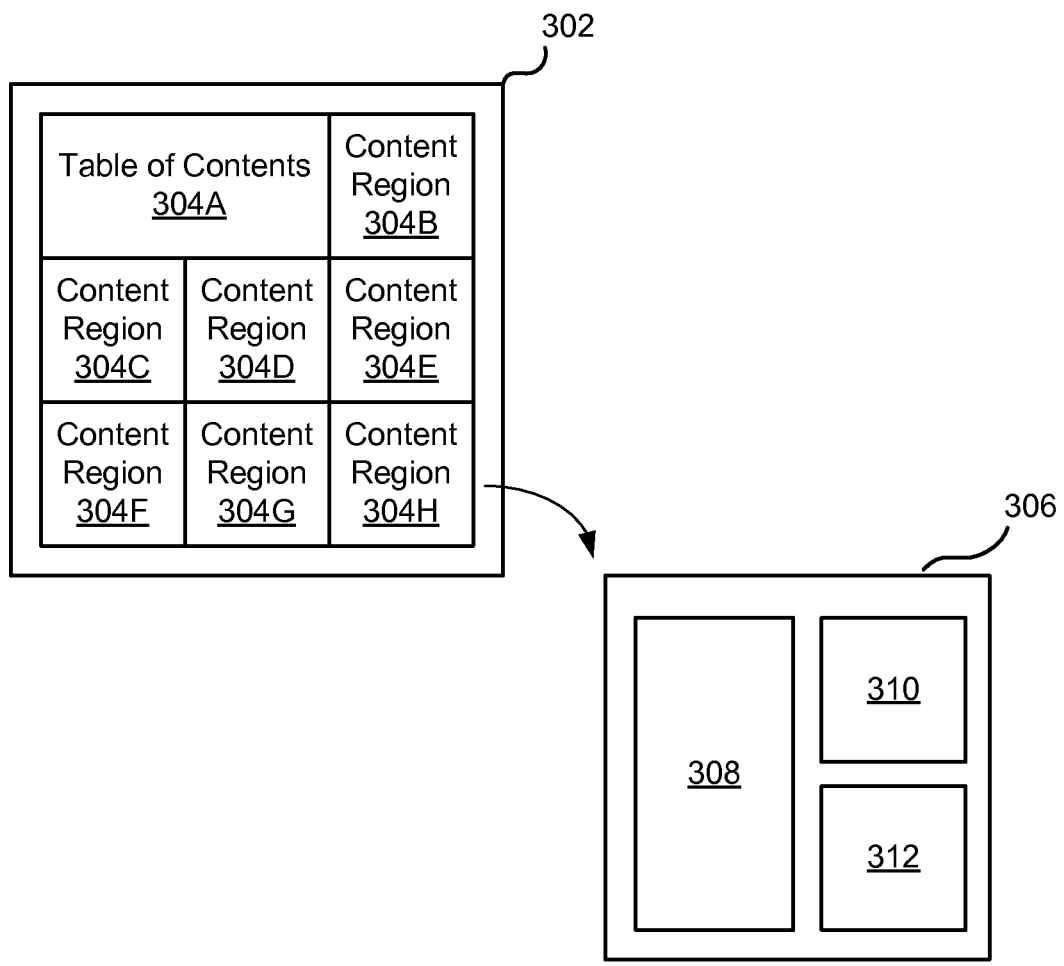
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 102 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Identifying Regions in an Image Based on Feature Points in the Image

Figure 4:
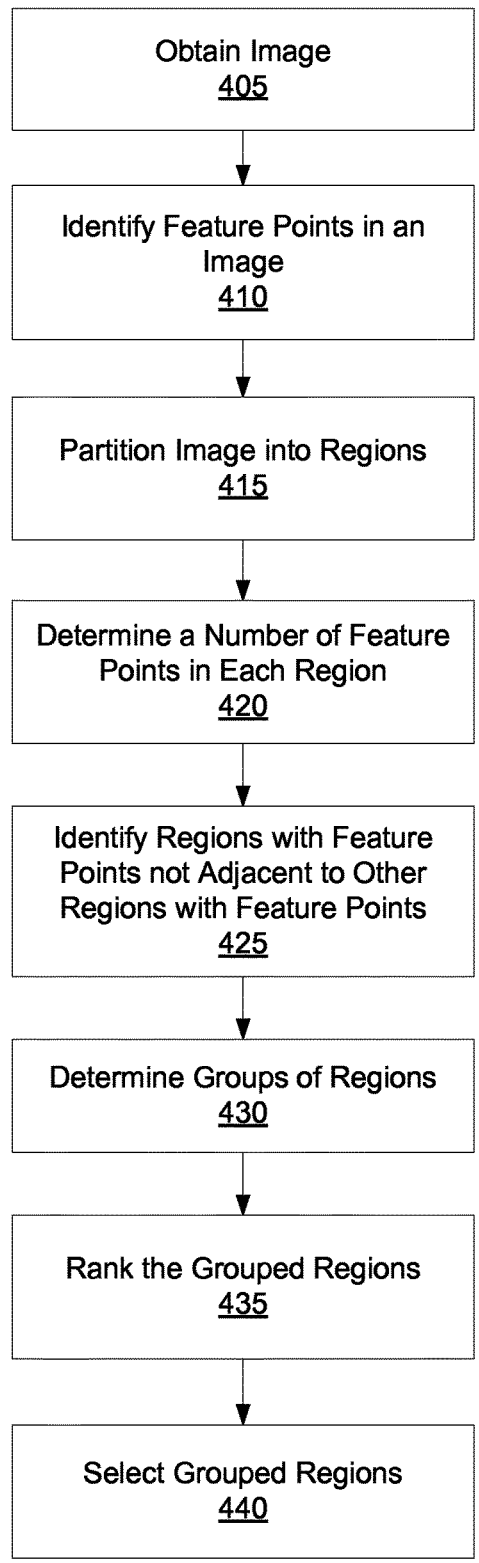
FIG. 4 shows a flowchart of a method for identifying regions in an image based on feature points included in the image, in accordance with an embodiment of the invention.

FIG. 4 shows a flowchart of one embodiment of a method for identifying regions of an image based on feature points in the image. In one embodiment, the functionality described in conjunction with FIG. 4 is performed by the layout engine 220; however, in other embodiments, any suitable component or combination of components may perform the functionality described in conjunction with FIG. 4. Additionally, in some embodiments, different and/or additional steps than those identified in FIG. 4 may be performed or the steps identified in FIG. 4 may be performed in different orders.

The digital magazine server 140, or an application associated with the digital magazine server 140 and executing on a client device 110, obtains 405 one or more images from one or more sources 110 or from the content store 215 for presentation to a user of the digital magazine server 140 in a digital magazine. For example, an image is obtained 404 from a source 110 for display with content associated with the source 110. Alternatively, an image is obtained 405 from the content store 215 for presentation with text data retrieved from the content store 215.

Various feature points are identified 410 from the obtained image. As used herein, a "feature point" in an image is a pixel or group of pixels identifying one or more characteristics or points of interest associated with an object in an image. For example, a feature point is a group of pixels identifying an edge or boundary (a "point of interest") of an object in an image. In one embodiment, a feature point is identified as a pixel or group of pixels in an image having at least a threshold change in color across the pixel or group of pixels; therefore, in some embodiments, a feature point is identified as one or more pixels in the image having at least a threshold change in color between a portion of the image adjacent to a boundary of the one or more pixels and an additional portion of the image adjacent to another boundary of the one or more pixels. For example, a pixel has a red-green-blue (RGB) value of 87 and an additional pixel that is adjacent to the pixel has an RGB value of 246. In this example, a feature point is identified as a set of adjacent pixels having at least a threshold change in RGB value of 100, so the pixel and the additional pixel are identified 410 as a feature point because they have a difference in RGB values of 159. However, other image processing methods may be used to identify 410 feature points; for example, various edge detection techniques may be used to identify feature points along the edges or boundaries of an object in the image. In one embodiment, feature points of the obtained image are identified 410 by manually review of the image. In another embodiment, the source 110 from which the image is obtained 405 provides information identifying 410 feature points in the image along with the image.

Additionally, the digital magazine server 140 may identify additional information associated with the identified feature points of the image. For example, a location or a position of identified feature points with respect to one or more boundaries of the image, an identifier associated with a feature point identified 410 from the image, and display attributes such as average color or size of an identified feature point are identified. For example, the digital magazine server 140 identifies 410 a feature point in the image and information describing the feature point (e.g., the location of the feature point with respect to the top left corner of the image, and the average color of the pixels associated with the feature point). In one embodiment, the digital magazine server 140 identifies a group of pixels associated with a feature point and stores pixel indices of pixels in the group to identify a location in the image corresponding to the feature point.

The digital magazine server 140 partitions 415 the image into regions that each specify a portion of the image having dimensions specified by the digital magazine server 140. In one embodiment, the digital magazine server 140 partitions 415 the image into multiple regions that are equally sized. For example, the image is partitioned 415 into multiple regions that have the same dimensions. In one example, the digital magazine server 140 specifies the dimensions of a region based on the size or dimensions of the image. The aspect ratio of the regions may be similar to the aspect ratio of the image. The digital magazine server 140 may determine the dimensions of a region by dividing the dimensions of an image by a constant value. In another example, the regions are non-overlapping geometric shapes corresponding to the application executing on the client device 130 for presenting the image after modification. For example, the regions may be circles for inserting circular images into the image. In another example, the regions may be polygons (e.g., rectangles) for inserting polygonal (e.g., rectangular) images or text into the original image. This allows the image to be partitioned 415 into regions based on the type of content to be included in the image after modification or based on the application displaying the image after modification. In one embodiment, the digital magazine server 140 does not partition 415 images having dimensions less than threshold values. Additionally, the digital magazine server 140 may specify minimum dimensions of regions. In some embodiments, the digital magazine server 140 also identifies additional information associated with the regions of the image. For example, the position of regions with respect to one or more boundaries of the image is identified, average color of the region, or other display attributes of one or more regions. In one embodiment, information describing an average color of pixels in a region and the location of the region with respect to the top left corner of the image is identified for various regions of the image.

A number of feature points in each region of the image are determined 420 by the digital magazine server 140. In one embodiment, the digital magazine server 140 compares location information associated with the identified feature points and the location information associated with a region to determine 420 the number of feature points within the region. For example, the digital magazine server 140 identifies the pixel indices of boundaries of a region and compares the pixel indices associated with the boundaries of the region with pixel indices associated with pixels included in feature points. Feature points associated with pixel indices within the boundaries of a region are identified as feature points included in the region. Alternatively, pixel indices associated with a feature point are compared to pixel indices of pixels within a region, and a feature point associated with pixel indices matching at least a threshold number of pixel indices in the region is identified as a feature point included in the region. Alternatively, other techniques may be used to compare the location information associated with identified feature points with the location information associated with a region to determine 420 the number of feature points in the region of the image. In one embodiment, the digital magazine server 140 associates an identifier with each region including at least a threshold number of feature points.

In one embodiment, the digital magazine server 140 identifies 425 regions including feature points that are not adjacent to other regions including feature points. Typically, an object in the image includes feature points in multiple adjacent regions, so regions including feature points that are not adjacent to other regions including feature points are often regions including feature points that do not correspond to an object in the image. Isolated feature points are typically associated with objects in the image having less than a threshold size or with minor changes across pixels in the image, so regions containing isolated feature points may be identified as regions of the image not including an object to prevent from obscuring. In one embodiment, the digital magazine server 140 determines whether regions within a threshold number of regions from a region including at least a threshold number of feature points include at least the threshold number of feature points. For example, the digital magazine server 140 determines if regions directly adjacent to a region including at least the threshold number of feature points include the threshold number of feature points. If regions adjacent to the region including at least the threshold number of feature points do not include at least the threshold number of feature points, the region is identified 425. In another example, the digital magazine server 140 determines if regions within 2 regions of a region including at least the threshold number of feature points include the threshold number of feature points and identifies 425 the region if regions within 2 regions of the region do not include at least the threshold number of feature points. In one embodiment, the digital magazine server 140 associates an identifier with regions including at least the threshold number of feature points that are not adjacent to other regions including at least the threshold number of feature points.

Based at least in part on the number of feature points in each region of the image, the digital magazine server 140 determines 430 groups of regions of the image. In one example, the digital magazine server 140 determines 430 that adjacent regions of the image each including less than a threshold number of feature points are included in a group. Alternatively, the digital magazine server 140 determines 430 that adjacent regions of the image each including at least a threshold number of feature points are included in a group. In another example, regions including at least a threshold number of feature points are included in a group along with additional regions that do not include at least the threshold number of feature points and are adjacent to the region. Alternatively, the digital magazine server 140 identifies a region of the image including a number of feature points and determines 430 that additional regions adjacent to the region and including a number of feature points within a threshold value of the number of feature points included in the region are included in a group including the region. In one embodiment, the digital magazine server 140 determines 430 groups including multiple adjacent regions of an image until a group reaches a threshold size, shape or aspect ratio. The digital magazine server 140 may determine 430 groups of regions by initially identifying regions in one or more corners of an image and identifying regions adjacent to the identified regions. A region in the image may be associated with more than one group. For example, a region in the top left corner of the image may be grouped with adjacent regions along the top border of the image and grouped with adjacent regions along the left border of the image.

The digital magazine server 140 identifies information associated with a group. For example, information identifying the location or position of a group within the image is stored in association with the group. For example, coordinates specifying boundaries of a group determined relative to a corner of the image are stored along with an identifier of the group. Additionally, an average color of pixels in a group, an aspect ratio of a group, a size of a group or other display attributes may be associated with a group.

In one embodiment, based at least in part on the information associated with groups of regions of the image, the digital magazine server 140 ranks 435 the groups of regions. For example, the groups of regions are ranked 435 based on the aspect ratios of the groups and location of the groups within image. As an example, a group of regions located in a corner of the image with an aspect ratio of 4:3 has a higher position in a ranking than a group of regions located towards the center of the image with an aspect ratio of 6:1. In another example, the groups of regions are ranked 435 based on the size or dimensions of the groups. As another example, the groups of regions are ranked 435 based in part on a number of feature points included in each group. Alternatively, groups with more than a threshold number of regions including at least a threshold number of feature points are ranked 435 separately from groups with less than the threshold number of regions including at least the threshold number of feature points. In one embodiment, the image, information associated with feature points in the image, information associated with regions of the image, information associated with groups of regions, and the ranking of groups are stored in the content store 215.

The digital magazine server 140 selects 440 one or more groups of regions to associate with the image. In one embodiment, the groups are selected 440 based at least in part on the ranking. For example, groups having at least a minimum aspect ratio and including less than a threshold number of feature points are selected 440 to identify portions of the image suitable for presenting text. The average color of a group may also be used when selecting 440 groups; for example, a color associated with text is determined and one or more groups having at least a minimum aspect ratio, including less than a threshold number of feature points, and having an average color differing from the color associated with the text are selected 440. In the preceding example, the digital magazine server 140 modifies the image by overlaying text associated in the one or more selected groups. Overlay of text on an image is further described in U.S. patent application Ser. No. 14/155,053. In another example, the digital magazine server 140 selects 440 groups having less than a threshold number of feature points and modifies the image by cropping the selected groups of regions. Alternatively, the digital magazine server 140 selects 440 groups having at least the threshold number of feature points to indicate one or more portions of the image to preserve when cropping the image.

In one embodiment, the digital magazine server 140 communicates information identifying the selected groups to a client device 130 along with the image. The client device 130 may modify the image (e.g., crop portions of the image, overlay text in the image, select text for presentation in the groups of regions of the image, etc) based at least in part on the selected groups of regions associated with the image and the information associated with the selected groups of regions. For example, the digital magazine server 140 communicates information identifying a location of one or more selected groups relative to a boundary of the image and an average color of each selected group to the client device 130.

The client device 130 or the digital magazine server 140 modifies the image based at least in part on the selected groups. For example, the image is modified to include text in one or more of the selected groups or is modified to remove one or more of the selected groups. In one embodiment, the modified image is presented by the client device 130 along with other content items in locations relative to each other based on slots in a page template. For example, a page template is selected and a slot in the page template is identified for presenting the modified image. The modified image is retrieved and presented to the user in a location and a size determined from the identified slot.

Example Identification of Regions in an Image

Figure 5A:
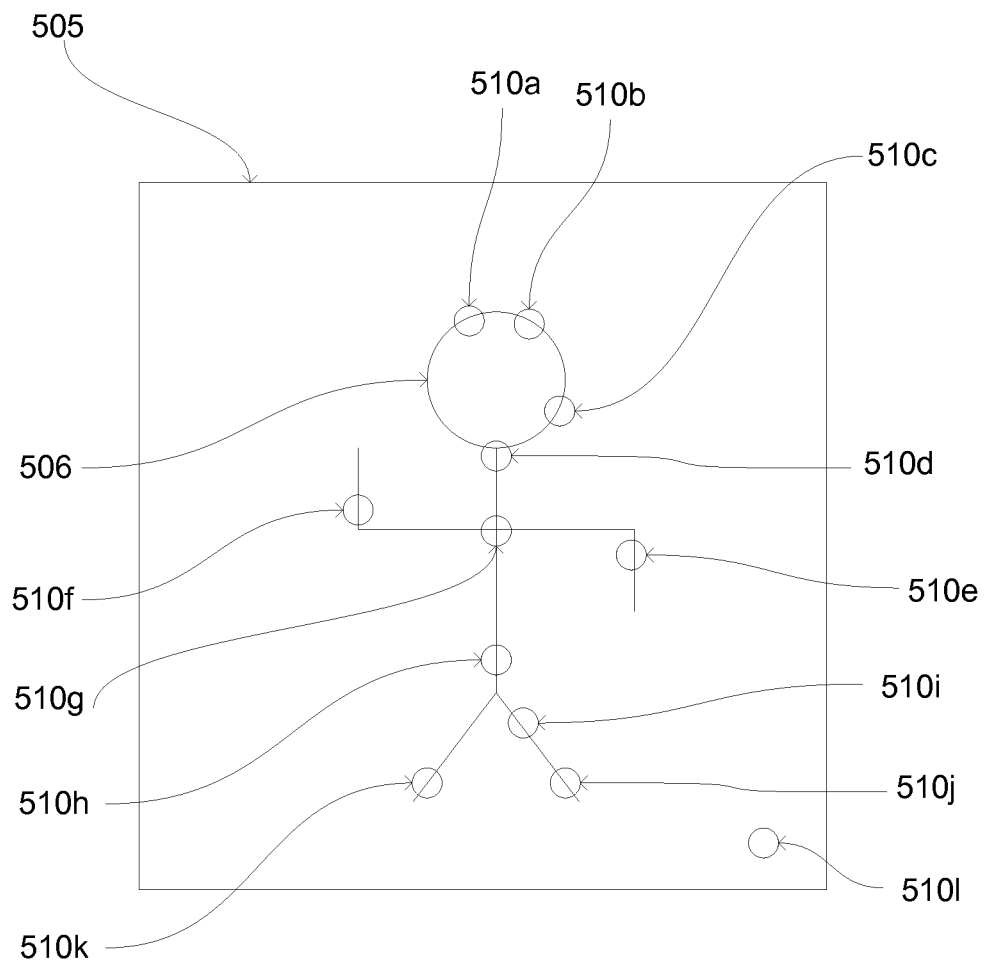
FIGS. 5*a*-5*e* illustrate an example of identifying, grouping and selecting regions of an image, in accordance with an embodiment of the invention.

FIGS. 5*a*-5*e* illustrate an example of identifying, grouping and selecting regions of an image. In FIG. 5*a*, an image 505 includes a person 506 and background content. In the example of FIG. 5*a*, the digital magazine server 140 identifies feature points 510*a*, 510*b*, 510*c*, 510*d*, 510*e*, 510*f*, 510*g*, 510*h*, 510*i*, 510*j*, 510*k*, and 510*l* (also referred to individually and collectively using reference number 510) in the image 505. As described above in conjunction with FIG. 4, the feature points 510 may be identified based on a color difference between adjacent pixels or based on any other suitable criteria. In the example of FIG. 5*a*, the feature points 510 identify a boundary between the person 506 and the background content of the image 505.

Figure 5B:
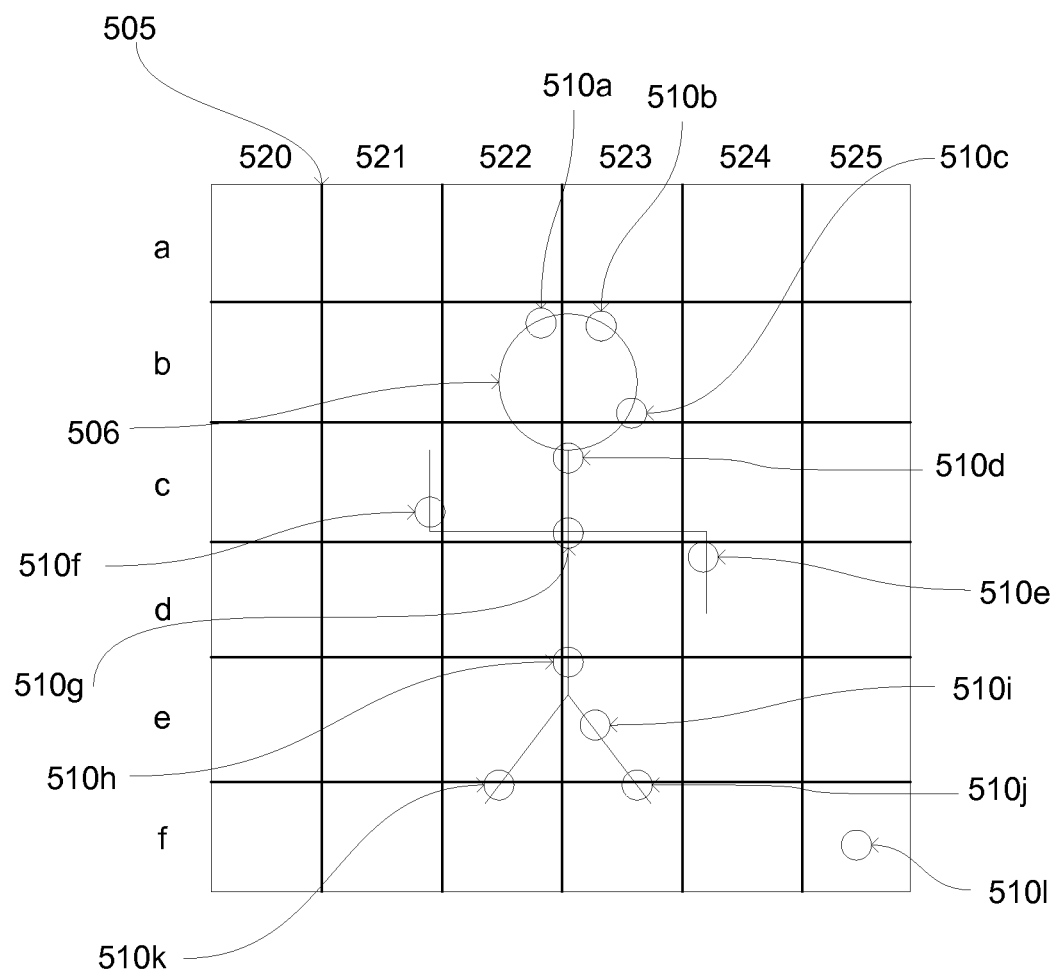

In FIG. 5*b*, the image 505 is partitioned into one or more equally-sized regions represented by columns 520, 521, 522, 523, 524, and 525 and rows a, b, c, d, e, and f. The digital magazine server 140 determines the number of feature points 510 in each region of the image. For example, the digital magazine server 140 determines that region 523*b* includes 2 feature points 510, feature point 510*b* and feature point 510*c*, as described above in conjunction with FIG. 4. The digital magazine server 140 also identifies regions of the image including at least a threshold number of feature points but not adjacent to another region including at least the threshold number of feature points. For example, if the threshold number of feature points is 1, the digital magazine server 140 identifies region 525*f* as a region including a feature point 510*l* that is not adjacent to another region of the image including a feature point 510.

Figure 5C:
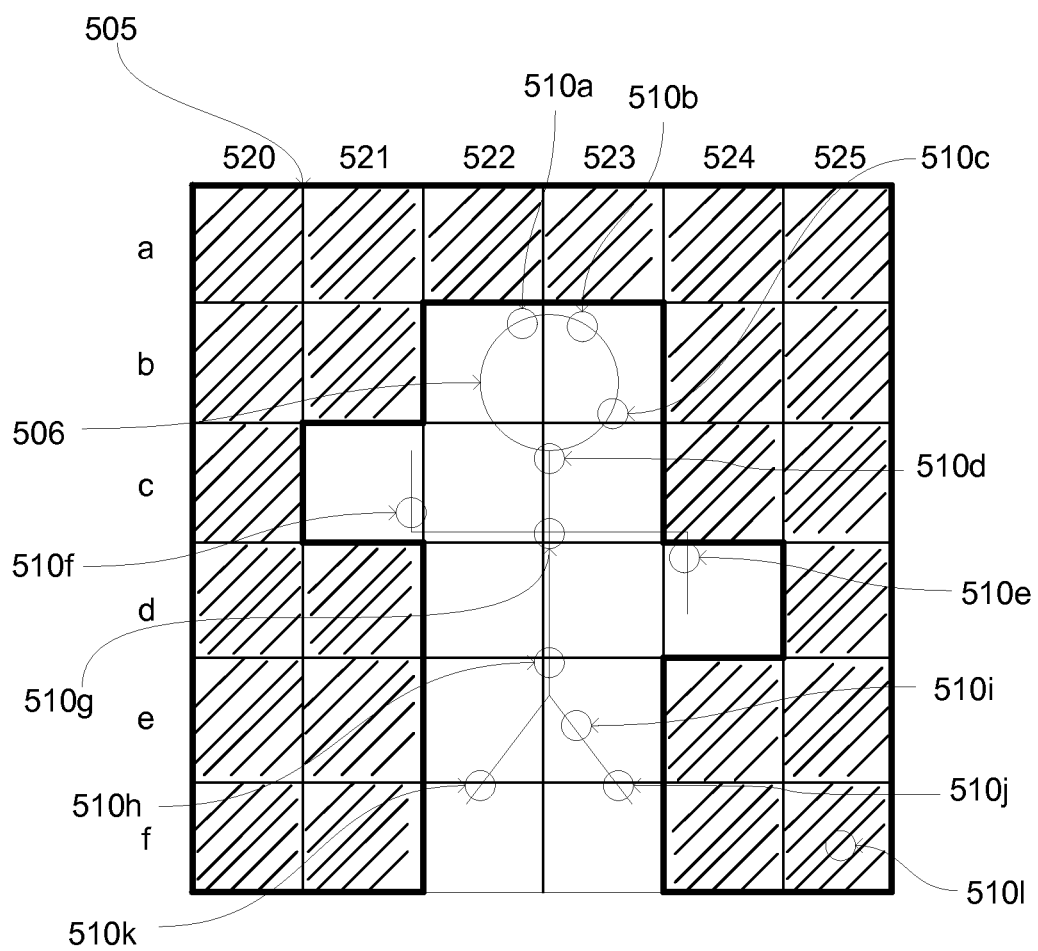

In FIG. 5*c*, the digital magazine server 140 generates groups including one or more adjacent regions of the image 505. In one embodiment, the digital magazine server 140 generates groups based on the number of feature points in adjacent regions. For example, in FIG. 5*c* regions 521*c*, 522*b*-*f*, 523*b*-*f* and 524*d* are grouped together as they are adjacent regions including at least one feature point 510. In another example, the digital magazine server 140 groups one or more regions including less than the threshold number of feature points 510; FIG. 5*c* illustrates groups of regions including less than a threshold number of one feature point 510 using shading. For example, the digital magazine server 140 generates a group including regions 520*a*-*b*, 521*a*-*b*, and 522*a* and another group including regions 520*a*-*b* and 521*a*-*b*. In one embodiment, the digital magazine server 140 ranks the groups of regions based at least in part on the aspect ratio, size, location and the average color of the groups of regions, as described in conjunction with FIG. 4. In another embodiment, the digital magazine server 140 generates groups corresponding to an application that displays the modified image or based on types of content to be included in a modified image. For example, groups may be polygons comprised of connected rectangular or triangular regions for inserting images, text, or other content having boundaries corresponding to the shape of the polygons into the image 505.

Figure 5D:
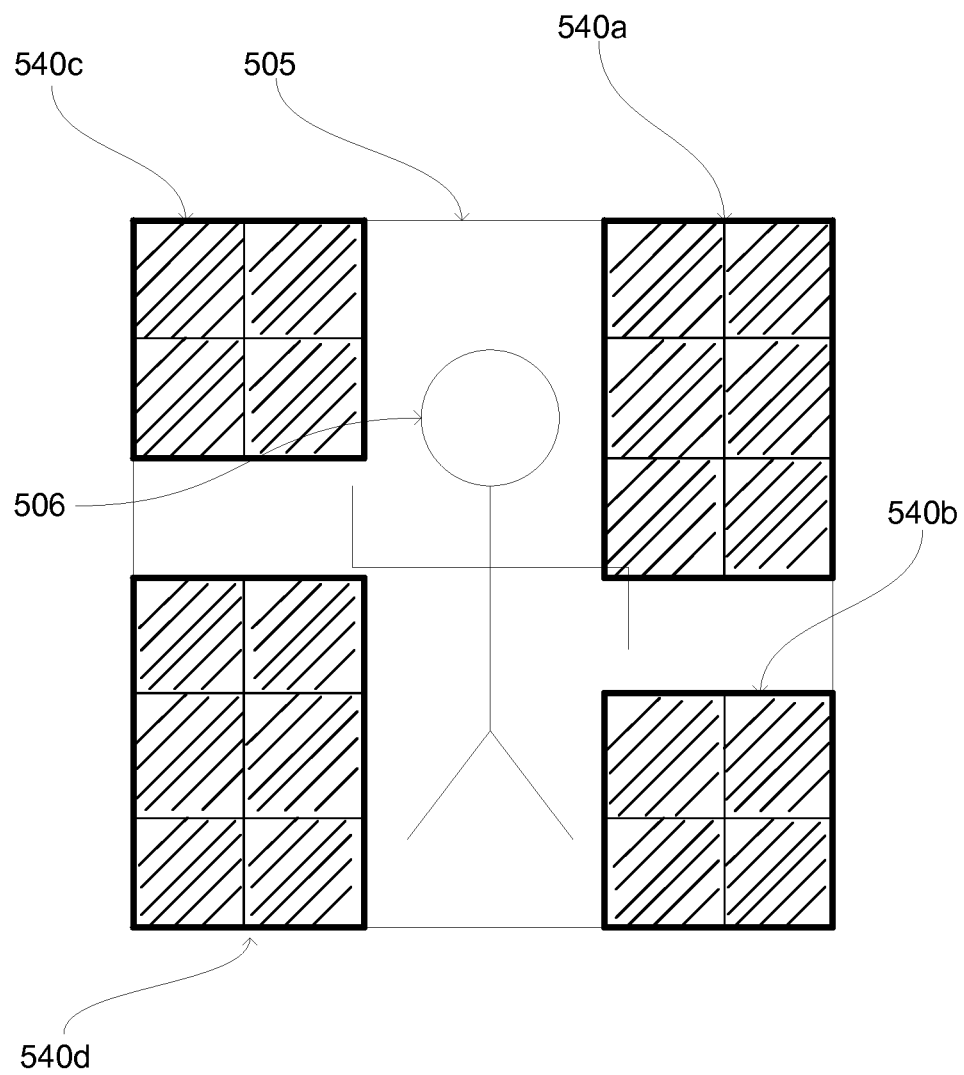

FIG. 5d shows an example of the digital magazine server 140 selecting one or more groups of regions based at least in part on the ranking of groups. In the example of FIG. 5d, the digital magazine server selects groups 540a, 540b, 540c, and 540d (also referred to individually and collectively using reference number 540) as groups of regions associated with the image. In one embodiment, the selected groups identify regions of the image free of objects. In one example, the image 505, information associated with feature points 510 in the image 505, information associated with the selected groups 540 and the selected groups 540 are stored in the content store 130. In another example, the digital magazine server 140 modifies the image 505 for presentation to the user of the digital magazine server 140 by overlaying text associated with the image 505 in one or more of the selected groups 540. As another example, the digital magazine server 140 sends information associated with the selected groups 540 with the image 505 to the client device 130, allowing the client device 130 to modify the image 505 based on the selected groups 540.

Figure 5E:
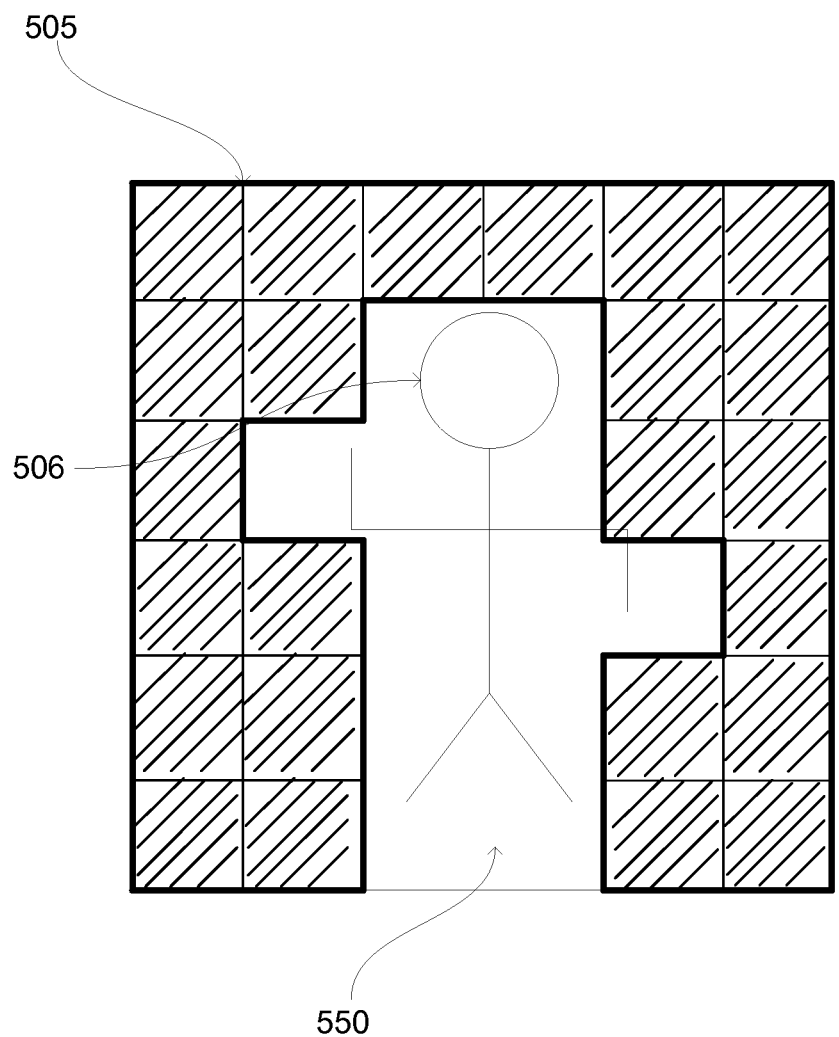

In FIG. 5e the digital magazine server 140 identifies groups that correspond to regions of the image including the object. In the example of FIG. 5e, the digital magazine server 140 selects group 550 as a group of regions based at least in part on the number of feature points in regions included in each region in the group 550, as described in conjunction with FIG. 4. In one embodiment, the digital magazine server 140 identifies the group of regions 550 as regions not to be cropped while resizing or modifying the image 505. Alternatively, information associated with the groups of regions adjacent to group 550, denoted by shading in FIG. 5e, may be associated with the image 505 to identify regions capable of being cropped when modifying the image 505. In one embodiment, information associated with the image 505, information associated with group 550, or information associated with the adjacent groups to group 550 are stored in the content store 215 or sent with the image 505 to the client device 130.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
obtaining an image for presentation to a user of a digital magazine;
identifying one or more feature points in the image, each feature point identifying a point of interest associated with an object in the image;
partitioning the image into a plurality of equally-sized regions;
determining a number of feature points in each region of the image;
determining one or more groups of adjacent regions based at least in part on the number of feature points in each region, each group including a plurality of regions adjacent to each other, by
identifying a region in the image;
identifying regions adjacent to the identified region including at least a threshold number of feature points; and
generating a group of regions including the identified region and the regions adjacent to the identified region including at least the threshold number of feature points; and identifying regions of the image including feature points that are not adjacent to at least one other region including feature points;

storing information identifying the one or more groups of regions in association with the image.

2. The method of claim 1, wherein identifying one or more feature points in the image comprises:

identifying one or more pixels in the image having at least a threshold change in color between a color associated with portion of the image adjacent to a boundary of the one or more pixels and an additional color associated with an additional portion of the image adjacent to another boundary of the one or more pixels.

3. The method of claim 1, wherein identifying one or more feature points in the image comprises:

identifying one or more pixels associated with an edge of an object in the image.

4. The method of claim 1, wherein partitioning the image into the plurality of equally sized regions comprises:

identifying dimensions of the image;

determining whether the dimensions of the image are greater than a threshold value; and responsive to determining the dimensions of the image are greater than threshold value, partitioning the image into a plurality of equally sized regions based at least in part on the dimensions of the image.

5. The method of claim 1, wherein determining the number of feature points in each region of the image comprises:

identifying location information associated with each feature point in the image;

identifying location information associated with each region in the image; and identifying a number of feature points in a region of the image based on feature points associated with location information included within location information associated with the region.

6. The method of claim 1, wherein determining one or more groups of regions based on the number of feature points in each region comprises:

identifying dimension information associated with each group; and ranking the determined groups based at least in part on the dimension information associated with each group.

7. The method of claim 6, wherein determining the one or more groups is based at least in part on dimension information associated with the one or more groups.

8. A method comprising:

obtaining an image for presentation to a user of a digital magazine;

identifying one or more feature points in the image, each feature point identifying a point of interest associated with an object in the image;

partitioning the image into a plurality of equally sized regions;

determining a number of feature points in each region of the image;

determining one or more groups of regions based at least in part on the number of feature points in each region, each group including a plurality of adjacent regions, by identifying a region in the image;

identifying regions adjacent to the identified region including at least a threshold number of feature points; and generating a group of regions including the identified region and the regions adjacent to the identified region including at least the threshold number of feature points;

identifying regions of the image including feature points that are not adjacent to at least one other region including feature points;

selecting text for presentation along with the image;

selecting one or more of the groups of regions for presenting the selected text, the selected one or more groups of regions including less than a threshold number of feature points; and modifying the image to present the selected text in the one or more selected groups of regions.

9. The method of claim 8, wherein identifying one or more feature points in the image comprises:

identifying one or more pixels in the image having at least a threshold change in color between a color associated with portion of the image adjacent to a boundary of the one or more pixels and an additional color associated with an additional portion of the image adjacent to another boundary of the one or more pixels.

10. The method of claim 8, wherein identifying one or more feature points in the image comprises:

identifying one or more pixels associated with an edge of an object in the image.

11. The method of claim 8, wherein the regions are rectangular and selecting one or more of the groups of regions for presenting the selected text comprises:

determining a height and a width of each of the determined group of regions;

ranking the determined groups of regions based at least in part on the determined heights and widths; and selecting one or more ranked groups of regions for presenting the selected text based at least in part on the ranking.

12. The method of claim 8, further comprising:

determining an average color associated with each of the selected group of regions; and selecting a portion of the selected text for presentation in one or more of the selected groups of regions based at least in part on the determined average colors and colors associated with the portions of the selected text.

* * * * *

UNITED STATES PATENT AND TRADEMARK OFFICE
CERTIFICATE OF CORRECTION

PATENT NO. : 9,715,735 B2
APPLICATION NO. : 14/604663
DATED : July 25, 2017
INVENTOR(S) : Meng Guo et al.

It is certified that error appears in the above-identified patent and that said Letters Patent is hereby corrected as shown below:

In the Claims

Column 18, Line 67, Claim 1, replace "feature points; and" with --feature points;--

Column 19, Lines 3-4, Claim 1, replace "feature points; storing information" with --feature points; and storing information--

Column 19, Line 10, Claim 2, replace "with portion of the image" with --with a portion of the image--

Column 19, Line 24, Claim 4, replace "greater than threshold value" with --greater than the threshold value--

Column 20, Line 21, Claim 8, replace "less than a threshold number" with --less than the threshold number--

Column 20, Line 29, Claim 9, replace "with portion of the image" with --with a portion of the image--

Signed and Sealed this
Twelfth Day of November, 2019

Andrei Iancu
*Director of the United States Patent and Trademark Office*